April 7, 1959
R. B. MORSE
2,880,812
TRACTOR HITCH
Filed May 23, 1957
2 Sheets-Sheet 1
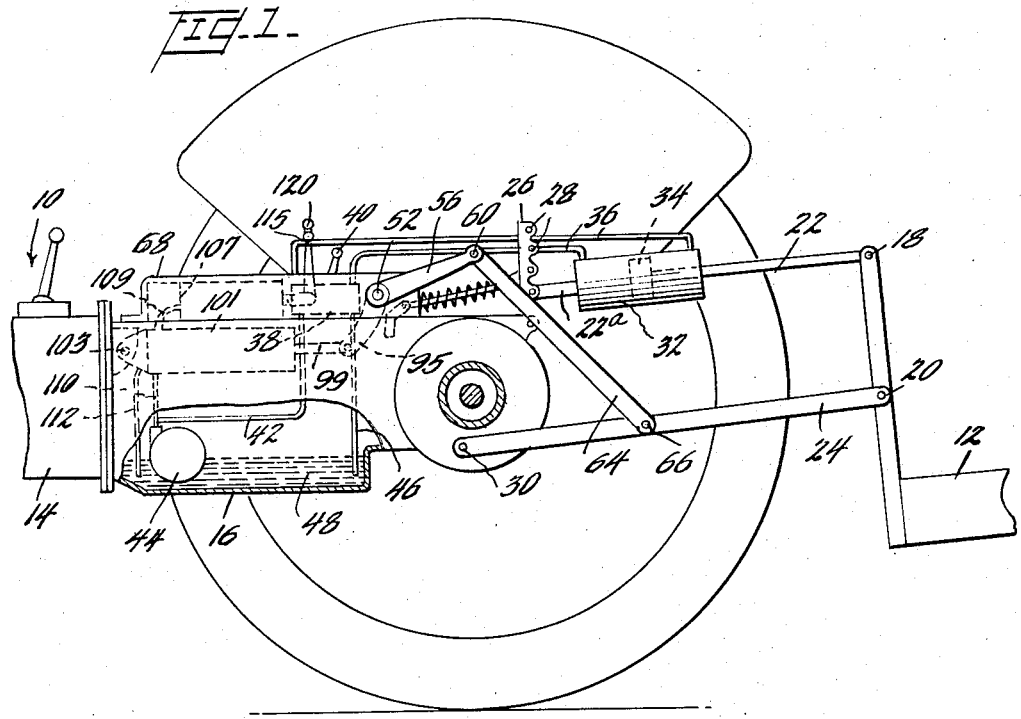
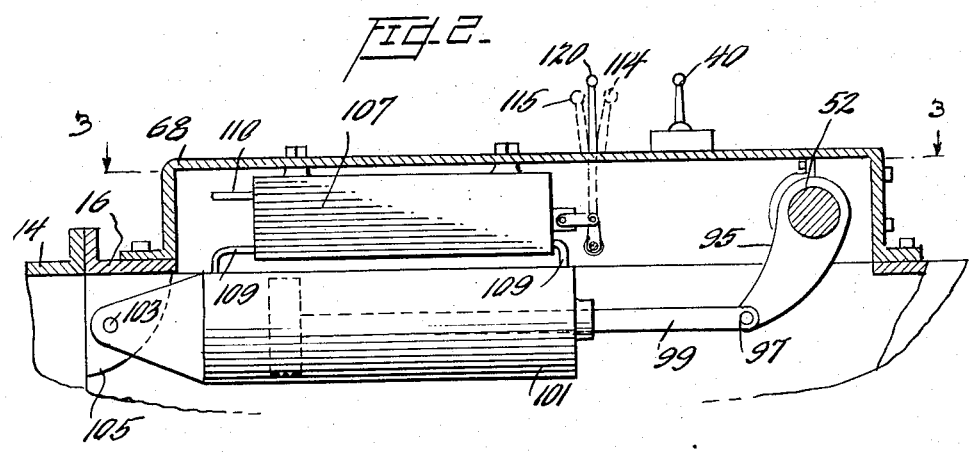
INVENTOR
Roland B. Morse,
BY Parker and Walsh.
ATTORNEYS April 7, 1959
R. B. MORSE
2,880,812
TRACTOR HITCH
Filed May 23, 1957
2 Sheets-Sheet 2
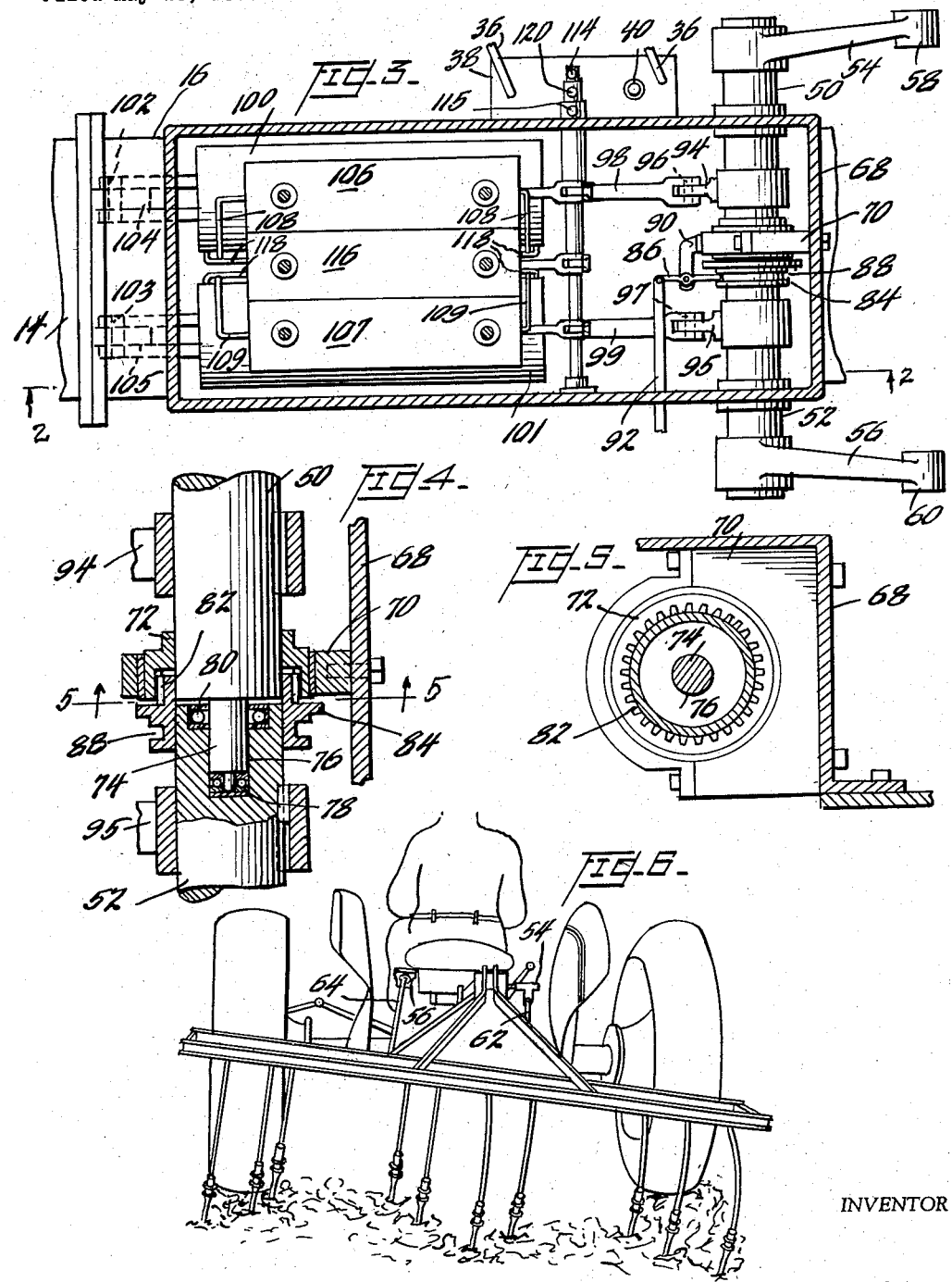
INVENTOR
Roland B. Morse
BY Parker and Welch
ATTORNEYS United States Patent Office  2,880,812
Patented Apr. 7, 1959

2,880,812

TRACTOR HITCH

Roland B. Morse, Whitingham, Vt.

Application May 23, 1957, Serial No. 661,173

5 Claims. (Cl. 172—460)

This invention relates to tractor hitches.

One of the more widely used types of tractors used for agricultural and related purposes at the present time, is provided with an hydraulic system for lifting or otherwise manipulating the implements attached to it. Tractors of this type, by means of an hydraulically operated crank arm have long been used for raising an implement, usually arranged to the rear of the tractor. In some cases, through a horizontal shaft, arranged at right angles to the path of tractor travel, and having a pair of crank arms, the lifting has been arranged to take effect at two points, one on each side of the center line of the tractor.

It may also be desirable to apply such lifting in a selective manner. Thus, when working upon sloping ground, there may be an advantage in working the implement on one side at a greater depth than the implement on the opposite side. In order to accomplish this, the crank arm on one side of the tractor is operated independently of the arm on the opposite side of the tractor. By selective operation of the two crank arms on the tractor unit its user may operate the two sides of the implement at selective depths. This type of hydraulic mechanism is known as selective lift.

In the known selective lift tractors, the two lift arms are completely independent one of the other. If the user wishes to raise and lower the implement, while maintaining the two sides in the same relative alignment, one with the other, it is necessary for him to operate two separate controls in such carefully synchronized relationship as will hold the implement in proper alignment. This is not easily carried out when the operator is guiding the tractor with one hand on the steering wheel and with the other attempting to manipulate two controls simultaneously.

This invention includes a combination of parts whereby the two arms of a selective lift may be selectively operated to vary the relative height of lift one with respect to the other in order to obtain selective operation. Additionally, the lifting mechanism is arranged so that while holding the relative lifting actions of the two sides of the lifting mechanism, it is also possible to lift or lower the entire mechanism in a manner analogous to the more elementary single lift.

In the more conventional lifting devices, the action has been confined to simple lifting up and down. At times, it has been desired to move the implement forward and backward with relationship to the towing tractor or it has been desired to change the angle of inclination of the implement being carried. In connection with the implement hitch, herein described, I have devised an arrangement whereby the linkage between the tractor and the implement can be altered to change the angle of inclination of the implement being carried or, it may be used to alter the relative closeness of the hitch.

For a fuller explanation of the means employed for carrying out the invention outlined above, reference should be had to the accompanying drawings wherein:

Figure 1 is an elevation, partly sectional and fragmentary showing the application of the invention to a rear portion of a tractor;

Figure 2 is an enlarged detail of Figure 1;

Figure 3 is a plan view partly in section taken along the line 3—3 of Figure 2;

Figure 4 is a further enlargement of a portion of Figure 3 with additional parts sectioned and some parts omitted for clarity;

Figure 5 is a section taken along the line 5—5 of Figure 4; and

Figure 6 is a rear perspective view of an implement attached to a tractor in accordance with the teachings of my invention.

In the drawings, the tractor is designated generally by the reference numeral 10 and an implement by numeral 12. Upon the transmission case 14 of the tractor, at the rear thereof, is mounted the hydraulic case 16.

The implement 12 is linked at two pairs of pivot points 18 and 20 by pairs of links 22 and 24 to the tractor 10. The forward parts of links 22, 22a are connected to an adjustable arrangement 26, not forming a part of the present invention at a series of optional pivot points 28. The lower links 24 are pivotally mounted below the rear axle at points 30. This series of links and pivot points form a quadrilateral whereby the implement may be raised and lowered into the ground behind the tractor. It will be obvious that the tractor-implement arrangement is susceptible of wide variation in accordance with well known principles which are not altered by the teachings of the present invention.

In the top link 22—22a there is inserted an hydraulic cylinder 32 secured to the portion 22a and piston 34 secured to the portion 22. The two ends of the cylinder 32 are connected by hydraulic lines 36 to control valve 38 having operating handle 40. The valve 38 is supplied with hydraulic fluid under pressure by a line 42 leading to pump 44 and, in turn, the valve returns hydraulic fluid by line 46 to sump 48 in which the pump 44 works. The operator of the tractor, by manipulating the valve handle 40 can shorten or lengthen link 22—22a to alter the shape of the quadrilateral hitch to thereby move the lower end of the implement 12 closer in toward the tractor 10 or otherwise alter the inclination of some working part of implement 12.

Upon the two portions 50, 52, of the shaft extending at right angles to the direction of tractor movement are mounted the crank arms 54 and 56. In turn, these arms are linked at pivot points 58 and 60 to a pair of links 62 and 64 which in turn are connected at intermediate points of the two links 24 at a pair of pivot points only one of which can be seen at 66. It will be obvious that by rotation of the shafts 50 and 52 in synchronizism, the lower links 24 will be rotated about point 30 to raise the implement 12.

At the rear of and within the cover 68 of hydraulic case 16 is a bearing 70 for supporting an enlargement 72 of the end of shaft 50. The shaft also has a reduced portion 74 freely rotatable within socket 76 in the corresponding end of shaft 52. Bearings 78 and 80 support the reduced portion within the socket so that shafts 50 and 52 will be able to rotate freely with respect to the tractor and with respect to each other at their meeting ends. Other bearings, spaced outwardly from this point, enable the shafts to rotate upon a common axis at right angles to the path of travel of the vehicle.

The enlarged portion 72 has at its outer end, an annular space formed between its outer wall and the full diameter of shaft 50. Within this annular space are a series of internal splines 82. A corresponding set of external splines are formed on the outer end of collar 84, slidably mounted upon the end of shaft 52. The collar 84 is prevented from rotating independently of shaft 52 by means of an additional set of splines, not shown.

The collar 84 may be moved lengthwise of shaft 52 by means of finger 86 working in annular slot 88 in the collar 84. The finger 86 is pivotally mounted in hanger 90 secured to the cap of bearing 70, being connected at its outer end with push rod 92 to which an operating handle, not shown, is secured to the left of transmission case 14. It will be readily apparent that through the means of the enlargement 72 the collar 84 and their associated parts, that the two shafts 50 and 52 may be engaged and disengaged at will to enable them to rotate as a single shaft or independently of each other.

A crank arm 94 fixed to shaft 50 is pivoted at 96 to piston rod 98 of hydraulic cylinder 100. The cylinder 100 is pivotally mounted at 102 to the lug 104 located on the wall between the transmission case 14 and the hydraulic case 16. A corresponding set of odd numbered parts 95 to 105 are provided for shaft 52.

A valve body 106 controls the admission of hydraulic fluid to cylinder 100 through lines 108. Both valve 106 and its corresponding valve 107 are supplied with fluid under pressure from pump 44 by line 110 and both discharge fluid into sump 48 by line 112. Through unnumbered operating mechanism extending out to the right hand side of hydraulic case 16, operating handle 114 controls valve 106 and handle 115 controls valve 107.

When shafts 50 and 52 are disengaged from each other, operation of handle 114 will serve to actuate piston rod 98 to effectuate partial rotation of shaft 50 and a corresponding movement of crank arm 54 to either lower or raise the right hand side of implement 12. Corresponding actuation of handle 115 will result in the raising or lowering of the left hand side of the implement. As the mechanism of valves 106 and 107 is arranged to maintain the valves in normally closed position, the implement will be held fixed at the position it is left in, when the operator's hand is taken off either handle 114 or 115. Thus, when it is desired to change the position of one side with respect to the other side, this is accomplished by first uncoupling the two shafts by manipulating push rod 92, followed by manipulating handle 114 or 115 or both. The two shafts may then be recoupled by operating push rod 92 once more.

A third valve 116 through hydraulic lines 118 connects to both ends of both cylinders 100 and 101, being operated by handle 120. This valve 116 receives fluid under pressure and discharges fluid to the sump through the same lines 110 and 112 serving cylinders 100 and 101. Since valve 106 supplies fluid under identical pressure conditions to both cylinders 100 and 101, it will be evident that operation of handle 120 will move both sides of the implement, the two shafts having first been interconnected together so that the entire implement 12 will be raised or lowered in whatever relative angular position it may be found in.

From the foregoing it will be seen that I have provided through valves 106 and 107 and their associated parts, means for raising or lowering one side or the other of the implement, with respect to its opposite side. Further, when this adjustment is made, it will remain fixed in exactly this relationship until changed again by the operator. By the operation of valve 116, the implement may be raised or lowered without disturbing the arrangement of the implement.

If desired, the operation of the spline clutch connecting the two shafts 50 nad 52 may be interlocked with the operation of operating handles 114, 115 and 120 so that operation of either handle 114 or 115 will automatically uncouple the clutch while operating handle 120 will automatically first couple the clutch.

In cooperation with the relative positioning of the two sides of the implement, hydraulic manipulation of the top link 22—22a will adjust the relationship of the implement to the tractor so that the entire combination will serve to more precisely enable the user of the tractor and implement to operate them both in ideal concert.

Although extensive reference has been made to an hydraulic system for movement of the respective parts of the combination herein disclosed, it is evident that other forms of adjustable mechanical linkage could be made to perform the same functions, although perhaps without the same ease in the present state of the art. Other modifications within the scope of the appended claims will also be obvious to one skilled in the art.

I claim:

1. A draft rigging for connecting an implement to a tractor including: a pair of shafts arranged in coaxial end-to-end relationship, means mounting said shafts on said tractor for at least partial rotation, clutch means on the respective abutting ends of said shafts for coupling them for common rotation, including means for engaging and disengaging said clutch, a crank arm upon each of said shafts, an hydraulic cylinder for each of said cranks connecting the crank with the tractor frame, valve apparatus for selectively admitting and discharging hydraulic fluid to each of said cylinders to selectively actuate said cranks to rotate said shafts, one with respect to the other when said shafts are uncoupled; additional valve apparatus for admitting and discharging hydraulic fluid to both of said cylinders simultaneously to effect joint rotation of said shafts when said shafts are coupled together and means for connecting said shafts to an implement to transfer the rotational movement of said shafts to said implement.

2. A draft rigging for connecting an implement to a tractor including: a pair of shafts arranged in coaxial end-to-end relationship, means mounting said shafts on said tractor for at least partial rotation, clutch means on the respective abutting ends of said shafts for coupling them for common rotation, including means for engaging and disengaging said clutch, means associated with each said shaft and its mounting for selectively rotating the respective shaft in its mounting when said shafts are uncoupled, separate means associated with both of said shafts and their mountings for rotating said shafts jointly in their mountings, when said shafts are coupled together and means for connecting said shafts to an implement to transfer the rotational movement of said shafts to said implement.

3. A draft rigging for connecting an implement to a tractor including: a pair of shafts arranged in coaxial end-to-end relationship, means mounting said shafts on said tractor for at least partial rotation, clutch means on the respective abutting ends of said shafts for coupling them for common rotation, including means for engaging and disengaging said clutch, means associated with at least one of said shafts and its mounting for selectively rotating said shaft in its mounting when said shafts are uncoupled, separate means associated with both of said shafts and their mountings for rotating said shafts jointly in their mountings, when said shafts are coupled together and crank means for connecting said shafts to an implement to convert the rotational movement of said shafts to lifting action upon said implement.

4. A draft rigging for connecting an implement to a tractor including: a pair of shafts arranged in coaxial end-to-end relationship, means mounting said shafts on the rear of said tractor for at least partial rotation, spline clutch means on the respective abutting ends of said shafts for coupling them for common rotation, including means for engaging one spline portion with respect to the other along the common axis of said shafts, means associated with at least one of said shafts and its mounting for selectively rotating said shaft in its mounting when said shafts are uncoupled, separate means associated with both of said shafts and their mountings for rotating said shafts jointly in their mountings, when said shafts are coupled together and means for connecting said shafts to an implement to transfer the rotational movement of said shafts to said implement.

5. A draft rigging for connecting an implement to a tractor including: a pair of shafts arranged in coaxial end-to-end relationship, means mounting said shafts on said tractor for at least partial rotation, clutch means on the respective abutting ends of said shafts for coupling them for common rotation, including means for engaging and disengaging said clutch, a crank arm upon each of said shafts, means associated with at least one of said cranks for selectively applying force thereto to rotate one of said shafts with respect to the other, when said shafts are uncoupled, a pair of hydraulic cylinders connecting each respective crank to the tractor frame, valve apparatus for admitting and discharging hydraulic fluid to said cylinders simultaneously to effect joint actuation of said cranks to cause joint rotation of said shafts when they are coupled together and means for connecting said shafts to an implement to transfer the rotational movement of said shafts to said implement.

References Cited in the file of this patent

UNITED STATES PATENTS

| | | |
|---|---|---|
| 2,337,764 | Mott | Dec. 28, 1943 |
| 2,566,547 | Bartlett | Sept. 4, 1951 |
| 2,755,721 | Rusconi | July 24, 1956 |

FOREIGN PATENTS

| | | |
|---|---|---|
| 667.488 | Great Britain | Mar. 5, 1952 |